United States Patent
Foglia

(10) Patent No.: US 10,709,284 B2
(45) Date of Patent: Jul. 14, 2020

(54) FAST-UNCOUPLING SHOWER SCREEN FOR ESPRESSO COFFEE MACHINES

(71) Applicant: SIMONELLI GROUP S.P.A., Belforte del Chienti (MC) (IT)

(72) Inventor: Simone Foglia, Macerata (IT)

(73) Assignee: SIMONELLI GROUP S.P.A., Belforte del Chienti (MC) (IT)

( * ) Notice: Subject to any disclaimer, the term of this patent is extended or adjusted under 35 U.S.C. 154(b) by 0 days.

(21) Appl. No.: 16/151,624

(22) Filed: Oct. 4, 2018

(65) Prior Publication Data

US 2019/0104881 A1 Apr. 11, 2019

(30) Foreign Application Priority Data

Oct. 11, 2017 (IT) .................. 102017000114469

(51) Int. Cl.
*A47J 31/06* (2006.01)
*A47J 31/44* (2006.01)

(52) U.S. Cl.
CPC ....... *A47J 31/0626* (2013.01); *A47J 31/0631* (2013.01); *A47J 31/4403* (2013.01); *A47J 31/446* (2013.01); *A47J 31/0657* (2013.01)

(58) Field of Classification Search
CPC ............... A47J 31/0626; A47J 31/4403; A47J 31/0631; A47J 31/446; A47J 31/0657; A47J 31/0621

USPC ....... 210/473, 439, 446, 449, 451, 481, 498, 210/450

See application file for complete search history.

(56) References Cited

U.S. PATENT DOCUMENTS 2,864,504 A * 12/1958 Jepson .................. A47J 31/043
210/238
4,064,795 A * 12/1977 Ackerman ............ A47J 31/057
99/304

FOREIGN PATENT DOCUMENTS

| EP | 1774880 A1 | 4/2007 |
| EP | 2071988 A1 | 6/2009 |
| FR | 2770987 A1 | 5/1995 |
| FR | 2973994 A1 | 10/2012 |

OTHER PUBLICATIONS

Search Report Form IT237 "Written Opinion" dated Jun. 27, 2018 with reference to the priority Italian Patent Application No. IT 102017000114469.

\* cited by examiner

*Primary Examiner* — Madeline Gonzalez
(74) *Attorney, Agent, or Firm* — Egbert, McDaniel & Swartz, PLLC

(57) ABSTRACT

Fast-uncoupling shower screen for espresso coffee machines having a circular support dish provided with holes, a flow restrictor disposed under the circular support dish, and an elastically deformable retention element, whereto the flow restrictor is fitted in snap-in coupling mode because of the elastic deformability of the retention element.

8 Claims, 2 Drawing Sheets

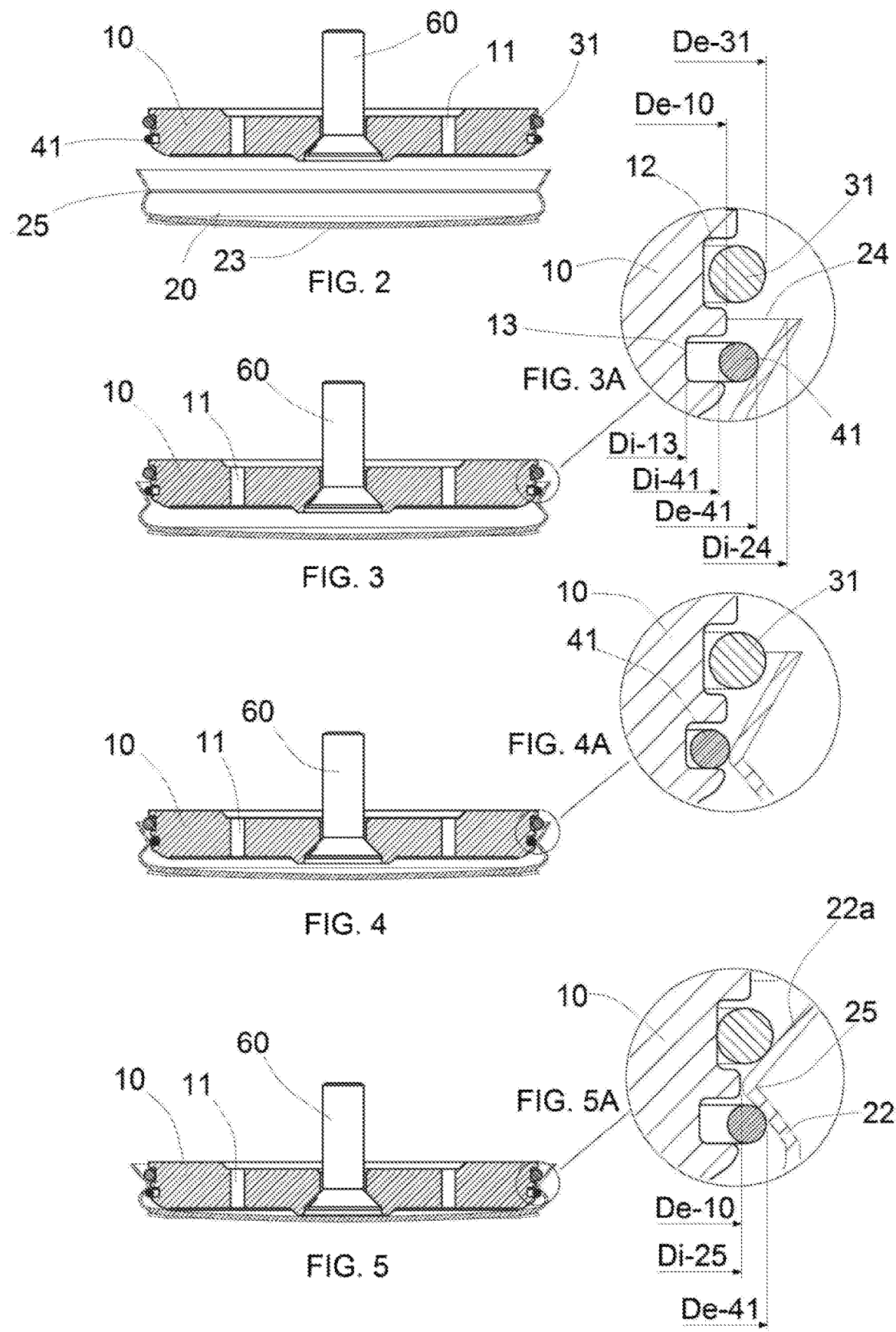

FAST-UNCOUPLING SHOWER SCREEN FOR ESPRESSO COFFEE MACHINES

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present patent application for industrial invention relates to a fast-uncoupling shower screen for espresso coffee machines.

2. Description of Related Art Including Information Disclosed Under 37 CFR 1.97 and 37 CFR 1.98

Espresso coffee machines are known, comprising a dispenser assembly that comprises an empty body that is internally provided with a lower circular mouth suitable for receiving and supporting the filter holder. The filter holder is coupled with said mouth by means of a traditional bayonet coupling, obtained by means of radial tabs obtained in external position on the body of the filter holder and suitable for penetrating and sliding inside annular slots obtained inside the mouth of the dispenser assembly.

As it is known, the filter holder comprises a handle that facilitates the manual operations that are to be made by the operator to repeatedly couple and uncouple the filter holder to and from the dispenser assembly every time coffee is prepared.

The body of the filter holder contains the filter. The filter consists in a tub suitable for receiving a compact dose of coffee powder; the bottom of the tub is provided with a dense set of small holes, suitable for holding the coffee power, while letting the water out of the filter holder through the dispensing nozzles that are obtained under the body of the filter holder.

The mouth of the dispenser assembly houses a shower screen provided with a close grid suitable for preventing the ascending flow of the coffee powder contained in the filter holder inside the dispenser assembly when the filter holder is coupled in the mouth of the dispenser assembly.

Said shower screen is made with a perforated sheet metal disk, which acts as a filtering partition that separates the water circuit upstream the dispenser assembly and the filter holder.

The fixing of said shower screen to the support ring must be stable, in spite of the fact that the shower screen is continuously and repeatedly exposed to rotational friction with the coffee powder and the body of the filter holder.

At the same time, on one hand, said fixing must prevent the peripheral leakage of water when water is dispensed, and on the other hand it must permit the easy and rapid uncoupling of the shower screen in order to clean the shower screen or replace any damaged or worn out parts.

In the coffee machines of the prior art, the most common fixing means consist in one or more screws that are inserted through one or more holes provided in the shower screen and tightened in threaded seats obtained inside the dispenser assembly.

The presence of said fixing screws results in several drawbacks, which consist in the uncomfortable, time-consuming operation of said screws, and in the negative effect on the uniform distribution of the water flow on the coffee powder contained in the filter.

The fixing screws are tightened with screwdrivers or Allen keys that are actuated manually, with a consequent waste of time. Moreover, the operator must pay attention not to come in direct contact with the dispenser assembly which can reach temperatures close to 100° C.

The presence of encrustations on the shower screen and on the fixing screws makes the dismount of the various parts difficult and long.

EP 2071988 discloses a device for preparing a beverage from a food ingredient provided to the device within a capsule. More particularly, the invention relates to such a device comprising an improved injection member which is connected to the device in a detachable manner by means of one or more hooks. However, such a device is not very reliable because the hooks may be easily broken and worn out because of the presence of scale and coffee residues that can be deposited on said hooks.

The purpose of the present invention is to remedy the drawbacks of the prior art, by providing a shower screen for espresso coffee machines that can be mounted and dismounted in a rapid, simple way, without using a screwdriver or an Allen key. Another purpose is to disclose a shower screen provided with resistant coupling/uncoupling means that are reliable and longlasting over time.

BRIEF SUMMARY OF THE INVENTION

These purposes are achieved according to the invention with the characteristics of the appended independent claim 1.

Advantageous embodiments will appear from the dependent claims.

The shower screen of the invention is defined by claim 1.

The advantages of the shower screen according to the invention are manifest, wherein because of the provision of the retention element, the flow restrictor can be easily coupled and uncoupled to and from the circular support dish, without using any fixing means that can get damaged or worn out because of the presence of scale and coffee residues.

The retention element may consists in an elastically deformable element that can be compressed to permit the snap-in coupling of the flow restrictor to the circular support dish and that can be expanded to prevent the flow restrictor from falling off.

For example, the retention element can be a separate element from the flow restrictor and from the support dish. In such a case, the retention means can be:

an open ring, which is also suitable for acting as gasket, or an element connected to a spring suitable for being compressed and expanded in transverse direction relative to the coupling direction of the flow restrictor.

Alternatively, the retention element can be integrally obtained in the flow restrictor and/or in the support dish. In such a case, the retention element can be a projection of the support dish or of the flow restrictor made of an elastically deformable material.

The abutment wall of the flow restrictor and/or the abutment wall of the circular support dish can be obtained in different ways, as long as they compress the retention element to permit the fixing of the flow restrictor to the circular support dish and the expansion of the retention element to prevent the release of the flow restrictor from the circular support dish.

For illustrative purposes, the abutment wall of the flow restrictor and/or the abutment wall of the circular support dish can be projections obtained by shaping the walls of the flow restrictor and/or of the circular support dish, as well as teeth fixed on the flow restrictor and/or on the circular support dish.

BRIEF DESCRIPTION OF THE SEVERAL VIEWS OF THE DRAWINGS

For the sake of clarity, the description of the shower screen according to the invention continues with reference to the attached drawings, which have a merely illustrative, not limiting value, wherein:

FIGS. 2 to 5 show the assembly sequence of the various parts of the shower screen according to the invention, all sectioned with a diametral plane;

FIGS. 3A, 4A, 5A are enlarged views of some details of FIGS. 3, 4 and 5.

DETAILED DESCRIPTION OF THE INVENTION

Figure 1:
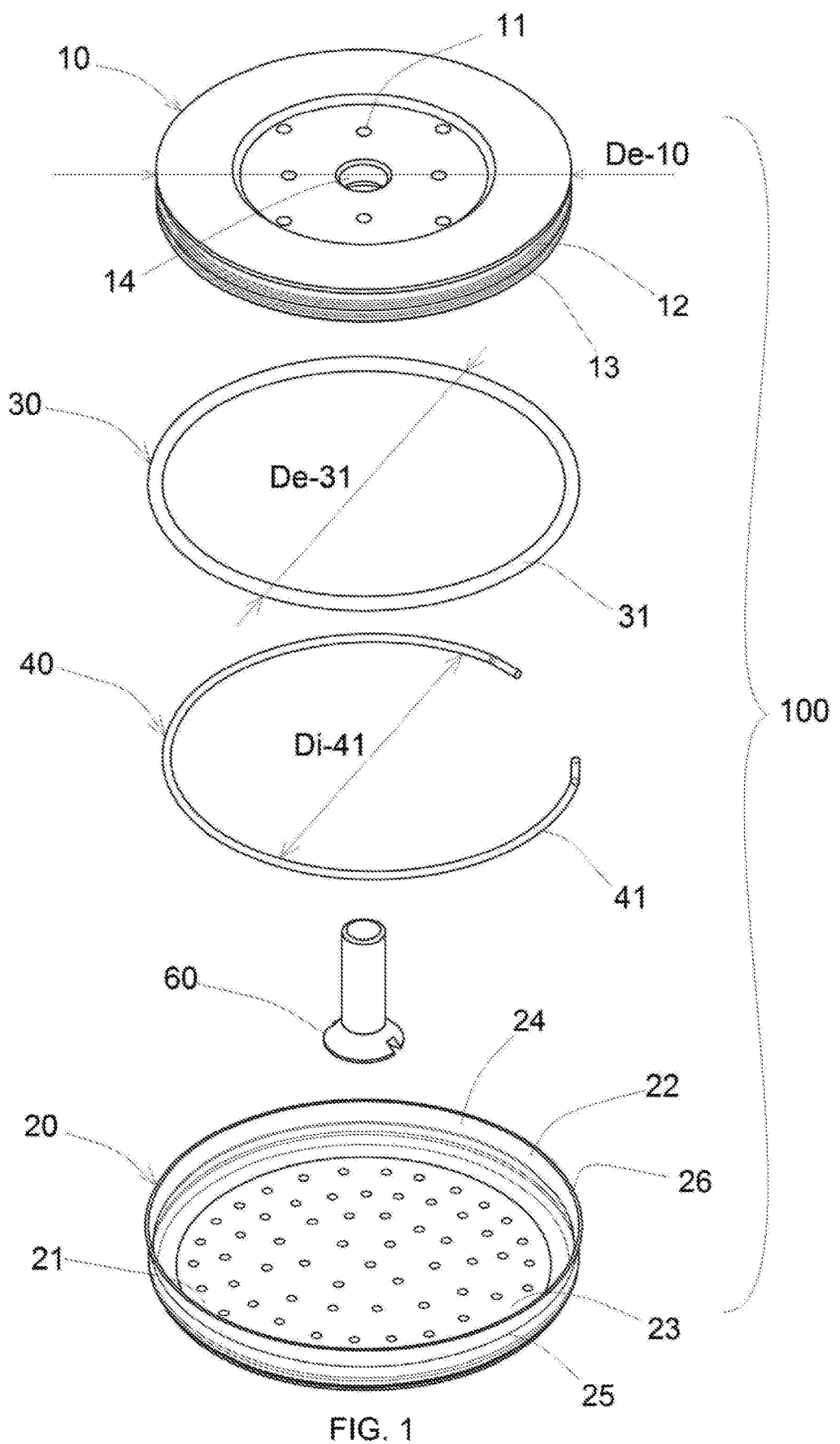
FIG. 1 is an exploded axonometric view of the various parts of the shower screen of the invention, in non-assembled condition.

With reference to FIG. 1, the shower screen (100) of the invention comprises a circular support dish (10) that removably supports a flow restrictor (20), a gasket ring (30) and an elastically deformable retention element (40) used for fixing said flow restrictor (20) to said circular support dish (10).

The gasket ring (30) is disposed between the circular support dish (10) and the flow restrictor (20).

Said circular support dish (10) is provided with a plurality of holes (11) for the passing of water dispensed by a dispenser assembly of the coffee machine.

The circular support dish (10) comprises a first annular groove (13) and a second annular groove (12).

The second annular groove (12) houses and supports the gasket ring (30), which consists in a rubber ring (31) disposed in said second annular groove (12), in such a way to peripherally project from the second annular groove (12) of the circular support dish (10).

The first annular groove (13) is disposed under the second annular groove (12). The first annular groove (13) houses and supports said retention element (40). The retention element (40) consists in an open ring (41) made of metal material. The retention element (40) is disposed in said first annular groove (13), in such a way as to peripherally project from said first annular groove (13), as shown in FIG. 3A, where said open ring (41) is shown in nondeformed position.

Being open, the open ring (41) is elastically flexible, in such a way that it can be elastically deformed in order to be reduced or enlarged, when suitably stressed.

As shown in FIG. 3A, the open ring (41) has an internal diameter (Di-41) and an external diameter (De-41). The first annular groove (13) has an internal diameter (Di-13) and the circular support dish (10) has an external diameter (De-10).

The internal diameter (Di-41) of said open ring (41) is greater than the internal diameter (Di-13) of said first annular groove (13), but smaller than the external diameter (De-10) of the support dish (10). The external diameter (De-41) of said open ring (41) is greater than the external diameter (De-10) of said support dish (10), as shown by the following inequality formulas:

$$De\text{-}10 > Di\text{-}41 > Di\text{-}13 \qquad (1)$$

$$De\text{-}41 > De\text{-}10 \qquad (2)$$

Because of the dimension of the diameters of the first annular groove (13), of the open ring (41) and of the circular support dish (10), as shown in the formulas (1) and (2):
- the open ring (41) is firmly fitted inside the first annular groove (13), partially protruding from it, until said open ring (41) is not deformed, as shown in FIG. 3A;
- the open ring (41) is elastically reduced, penetrating in higher depth inside the first annular groove (13), as shown in FIG. 4A;
- the open ring (41) is elastically expanded until it is completely ejected and released from the first annular groove (13).

The flow restrictor (20) consists in a circular tub (21), which comprises a bottom (23) and a plurality of holes (23a). The flow restrictor (20) is fixed below the circular support dish (10) and is suitable for restricting a water flow from the holes (11) of the circular support dish (10) and dispensing a plurality of water jets through the holes (23a) of the flow restrictor.

The tub (21) of the flow restrictor comprises a shaped wall (22) and a mouth (24) defined by an edge (26). The mouth (24) is suitable for inserting the circular support dish (10) inside the tub (21) until the edge (26) of the mouth (24) abuts against the rubber ring (31).

Said shaped wall (22) has an hourglass-shaped profile, having a first downward-converging part (22a) and a second downward-diverging part (22b), in such a way to generate an annular groove (25) with an internal diameter (Di-25) in external position on said shaped wall (22).

The internal diameter (Di25) of said groove (25) is smaller than the external diameter (De-41) of the open ring (41) when it is not deformed.

The internal diameter (Di-25) of the annular groove (25) is identical to or slightly greater than the external diameter (De-10) of the circular supporting dish (10), as shown in FIG. 5A.

The internal diameter (Di-24) of the mouth (24) of said tub (21) is greater than the external diameter (De-31) of said rubber ring (31).

The external diameter (De-31) of the rubber ring (31) is greater than the internal diameter (Di-25) of the annular groove (25).

According to the following inequality formulas:

$$(Di\text{-}24) > (De\text{-}31) > (Di\text{-}25) \qquad (3)$$

$$(De\text{-}41) > (Di\text{-}25) \geq (De\text{-}10) \qquad (4)$$

With reference to FIGS. 2 to 5, this description continues by illustrating the way in which the shower screen (100) is mounted inside an ordinary dispenser assembly for espresso coffee machines.

The first operation consists in mounting the rubber ring (31) and the open ring (41) in the corresponding annular grooves (13; 12) obtained on the edge of the circular support dish (10).

In both cases, the elastic deformability of the rubber ring (31) and of the open ring (41) permits to enlarge them sufficiently in order to be inserted outside the circular support dish (10), around which they are automatically fitted when the deformation ends.

The next operation consists in fixing the circular support dish (10) inside the dispenser assembly, by means of an ordinary fixing screw (60) that is inserted through a central hole (14) of the circular support dish (10) and screwed into a threaded seat that is obtained inside the dispenser assembly.

The last operation consists in fitting the flow restrictor (20) to the circular support dish (10); this operation only requires to axially push the flow restrictor (20) from down upwards, until said edge (26) of the mouth (24) of the tub of the flow restrictor abuts against the rubber ring (31), as shown in FIG. 5.

Before stopping the edge (26) of the mouth (24) against the rubber ring (31), the annular groove (25) obtained on the edge (22) of the tub (21) interferes with the open ring (41), forcing it to be constrained inside the first annular groove (13), as shown in FIG. 4A.

The internal diameter (Di-41) of said open ring (41) is greater than the internal diameter (Di-13) of said first annular groove (13), and therefore an elastic deformation can be imposed on the open ring (41) that is positioned inside the first annular groove (13), determining a temporary reduction of its external diameter (De-41). So, the annular groove (25) acts as abutment wall for the retention element. Because of the deformation, the retention element may come in contact with a bottom wall of the first annular groove (13). In such a case, also the bottom wall of the first annular groove (13) acts as abutment wall for the retention element.

Evidently, as soon as the interference between said annular groove (25) and said open ring (41) ends, the open ring (41) is elastically expanded, recovering its dimension in non-deformed position, as shown FIG. 5A.

Because of the expansion of the open ring (41), the tub (22) remains attached and fitted to the circular support dish (10) since the interference between the non-deformed open ring (41) and the annular groove (25) prevents the tub (22) from falling freely, as shown in FIG. 5A.

In order to uncouple the flow restrictor (20) from the circular support dish (10) the tub (22) simply needs to be held and pulled downwards in axial direction, with sufficient energy to cause a new elastic reduction of the open ring (41).

The fixing operation of the circular support dish (10) to the dispenser assembly may be eliminated if the dish is obtained in one piece with the dispenser assembly.

In the aforementioned embodiment, the open ring (41) acts as retention element, whereas the annular groove (25) and, eventually, also the bottom wall of the first annular groove (13) act as abutment walls.

The main characteristic of the present invention is represented by the elastically deformable retention element, which is suitable for cooperating with an abutment wall of the flow restrictor and/or with an abutment wall of the circular support dish, in such a way that the flow restrictor is fitted to the circular support dish in snap-in coupling mode.

Although not shown in the figures, the retention element can be connected to or integral with the flow restrictor and can interfere only with the abutment wall of the support dish or with both the abutment wall of the support dish and the abutment wall of the flow restrictor.

I claim:

1. A shower screen for an espresso coffee machine, the shower screen comprising:
    a circular support dish having holes formed therein, said circular support dish adapted to pass water dispensed by a dispenser assembly of the espresso coffee machine;
    a flow restrictor having a tub with a bottom and a plurality of holes, said flow restrictor affixed below said circular support dish, said flow restrictor adapted to restrict a water flow from the holes of said circular support dish and to dispense a plurality of jets of water through the plurality of holes of said flow restrictor; and
    an elastically deformable retention element cooperative with an abutment wall of said flow restrictor and with an abutment wall of said circular support dish such that said flow restrictor is fitted to said circular support dish with a snap-in-coupling, wherein said elastically deformable retention element is an open ring with a split formed in a circumference of the open ring.

2. The shower screen of claim 1, wherein said circular support dish has a first annular groove housing the open ring such that the open ring peripherally protrudes from said first annular groove.

3. The shower screen of claim 1, further comprising:
    a gasket ring positioned between said circular support dish and said flow restrictor.

4. The shower screen of claim 3, wherein said gasket ring is a rubber ring.

5. The shower screen of claim 3, wherein said circular support dish has a first annular groove housing the open ring and a second annular groove housing said gasket ring, said gasket ring periperally protruding from said circular support dish.

6. The shower screen of claim 5, wherein the open ring has an internal diameter and an external diameter, wherein the first annular groove has an internal diameter, wherein said circular support dish has an external diameter, wherein said circular support dish has an external diameter, the external diameter of said circular support dish being greater than internal diameter of the open ring, the internal diameter of the open ring being greater than the internal diameter of the first annular groove, the external diameter of the open ring being greater than the external diameter of said circular support dish.

7. The shower screen of claim 6, wherein said tub of said flow restrictor has a shaped wall and a mouth defined by an edge, said circular support dish being inserted into the tub through the mouth until the edge of the mouth abuts against said gasket ring.

8. The shower screen of claim 7, wherien the shaped wall of the tub has an hourglass-shaped profile with a first downward-converging part and a second downward-diverging part so as to form another annular groove on an eterior of the shaped wall, the another groove having an internal diameter that is less than an external diameter of the open ring when the open ring is not deformed, the internal diameter of the another annular groove being identical to or slightly greater than the external diameter of said circular support dish, the internal diameter of the mough being greater than the external diameter of said gasket ring, the external diameter of said gasket ring being greatr than the internal diameter of the another annular groove.

\* \* \* \* \*